(12) United States Patent
Stelandre et al.

(10) Patent No.: US 6,790,895 B2
(45) Date of Patent: Sep. 14, 2004

(54) USE OF HYDROTALCITE AS FILLER IN POLYMER COMPOSITIONS

(75) Inventors: Laurence Stelandre, Lille (FR); Michel Foulon, Vaires sur Marne (FR); Pierre-Yves Le Goff, Paris (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 10/296,123

(22) PCT Filed: May 28, 2001

(86) PCT No.: PCT/FR01/01640

§ 371 (c)(1),
(2), (4) Date: Feb. 12, 2003

(87) PCT Pub. No.: WO01/90235

PCT Pub. Date: Nov. 29, 2001

(65) Prior Publication Data

US 2003/0158319 A1 Aug. 21, 2003

(30) Foreign Application Priority Data

May 26, 2000 (FR) .................................... 00 07803

(51) Int. Cl.⁷ ................................................ C08K 9/04
(52) U.S. Cl. ....................................................... 524/436
(58) Field of Search ........................................ 524/436

(56) References Cited

U.S. PATENT DOCUMENTS

| | | | | |
|---|---|---|---|---|
| 4,822,547 A | * | 4/1989 | Derrick | 264/169 |
| 5,374,484 A | * | 12/1994 | Kasahara et al. | 428/421 |
| 5,484,583 A | * | 1/1996 | Grubbs et al. | 423/420.2 |
| 5,674,972 A | * | 10/1997 | Wabeeke et al. | 528/310 |
| 5,741,526 A | * | 4/1998 | Miyata | 424/635 |
| 5,941,037 A | * | 8/1999 | Hallock et al. | 52/407.1 |

FOREIGN PATENT DOCUMENTS

| | | | | |
|---|---|---|---|---|
| EP | 0 097 330 | | 1/1984 | C08J/3/24 |
| JP | 01182366 A | * | 7/1989 | C08L/101/00 |
| JP | 04359064 A | * | 12/1992 | C08L/101/00 |

OTHER PUBLICATIONS

JPO computer translation of JP 11–012392 (Jan. 19, 1999).*

JPO computer translation of JP 05–086229 (Jun. 4, 1993).*

USPTO obtained translation for JP 01182366 A (Jul. 20, 1989), Sakai, et al.*

USPTO obtained translation for JP 04 359064A (Dec. 11, 1992), Kojima.*

Database WPI—Section Ch, Week 199318 Derwent Publication Ltd., London, GB; AN 1993–149325, XP002158901 & JP 05 086229 A (KYOWA KAGAKU KOGYO KK), Apr. 6, 1993 abstract.

* cited by examiner

Primary Examiner—Matthew A. Thexton

(57) ABSTRACT

The invention concerns the use as filler, in a polymer composition, of hydrotalcite calcined and/or incorporated with an anionic surfactant. The invention also concerns polymer compositions comprising such filler and finished articles based on said compositions.

22 Claims, No Drawings

USE OF HYDROTALCITE AS FILLER IN POLYMER COMPOSITIONS

This application is an application under 35 U.S.C. Section 371 of International Application Number PCT/FR01/01640 filed on May 28, 2001.

The present invention relates to the use as filler, in polymer compositions, of calcined hydrotalcite and/or hydrotalcite intercalated using at least one anionic surface-active agent.

It also relates to the polymer compositions thus obtained.

Finally, it also relates to finished articles based on these compositions, in particular tire covers.

It is known to employ reinforcing white fillers in polymers, in particular elastomers, such as, for example, precipitated silica. However, the results are not always those hoped for.

The aim of the invention is to provide another filler for polymer compositions which provides them with a highly satisfactory compromise with regard to properties, namely, preferably:

good rheological properties and excellent suitability for vulcanization, at least comparable with those of highly dispersible precipitated silicas, particularly advantageous dynamic properties, in particular a Payne effect of relatively low amplitude, resulting in a rather low resistance to rolling for tires based on these compositions, and/or a rather high tangent δ at 0° C., resulting in an improved adhesion for tires based on these compositions, good strengthening in terms of modulus, a generally high resistance to thermal aging and to UV (ultraviolet radiation) aging.

With this aim, a subject matter of the present invention is the use as filler, in particular as reinforcing filler, in a composition comprising polymer(s), of at least one calcined hydrotalcite and/or hydrotalcite intercalated by at least one anionic surface-active agent.

The hydrotalcite used in the context of the invention is thus at least one of the following compounds:

(a) a calcined hydrotalcite, (b) a hydrotalcite which is calcined and then intercalated using at least one anionic surface-active agent (intercalated calcined hydrotalcite), (c) a hydrotalcite intercalated using at least one anionic surface-active agent (intercalated hydrotalcite).

Use is advantageously made, in the context of the invention, rather of a calcined hydrotalcite (a), optionally additionally intercalated (b).

Even if the hydrotalcite used as filler according to the invention can comprise at least one monovalent cation, such as, for example, Li, and at least one trivalent cation, it usually contains rather at least one divalent cation and at least one trivalent cation; the divalent cation to trivalent cation molar ratio is then generally between 1 and 8, and preferably between 2 and 6.

The divalent cation can be in particular Mg, Ni, Zn or Co.

The trivalent cation can be, for example, Al, Ga, Fe or Cr.

Advantageously, the divalent cation is Mg and the trivalent cation is Al (magnesium aluminum hydrotalcite); the Mg/Al molar ratio is then generally between 1.5 and 5, preferably between 2 and 4, particularly between 2 and 3.

The starting hydrotalcite (that is to say, noncalcined and nonintercalated) can be prepared by any process known to a person skilled in the art. Thus, it can, for example, be obtained by neutralizing, by addition of a sodium carbonate solution, a vessel heel comprising the two types of cations mentioned above, in this instance at least one divalent cation (or monovalent cation) and at least one trivalent cation; the temperature of the reaction medium can be maintained between 50 and 95° C., in particular between 60 and 90° C., the pH being, for example, between 10 and 12.

The starting hydrotalcite can be obtained by simultaneously adding, to a vessel heel formed of water, a solution comprising acid salts of the two cations (or two solutions each comprising an acid salt of one of the two cations), a sodium carbonate solution and a sodium hydroxide solution (the latter serving in particular to adjust the pH, in particular to a value of between 10 and 12, for example to 11); the duration of the simultaneous addition can vary between 30 and 90 minutes, for example between 45 and 60 minutes; the temperature of the reaction medium can be maintained between 25 and 95° C.; in particular, the temperature during the simultaneous addition can be maintained between 25 and 35° C., for example at 30° C. approximately; on conclusion of this simultaneous addition, the temperature can be brought and maintained between 85 and 95° C., for example at approximately 90° C., in particular for 1 to 3 hours, for example for 2 hours.

The starting hydrotalcite can be a basic magnesium aluminum carbonate, for example of formula $MgCO_3.5Mg(OH)_2.2Al(OH)_3.yH_2O$ (in which $y \geq 0$, for example y=4).

The hydrotalcite used in the context of the invention, in particular the calcined hydrotalcite (a), optionally intercalated (b), preferably has a BET specific surface of between 100 and 300 $m^2/g$, generally between 120 and 220 $m^2/g$, in particular between 130 and 200 $m^2/g$; it is, for example, between 150 and 180 $m^2/g$. The BET surface is determined according to the method of Brunauer-Emmet-Teller described in The Journal of the American Society, Vol. 60, page 309, February 1938 and corresponding to Standard NF T 45007 (November 1987)

It generally has a CTAB specific surface of between 100 and 300 $m^2/g$, in particular between 120 and 210 $m^2/g$, especially between 130 and 190 $m^2/g$; it can be between 150 and 180 $m^2/g$. The CTAB surface is the external surface determined according to Standard NF T 45007 (November 1987-5.12).

The calcined hydrotalcite employed preferably results from a calcination treatment of a hydrotalcite (referred to as "starting hydrotalcite") at a temperature of at least 250° C., in particular of at least 300° C.; the calcination temperature is preferably between 300 and 600° C. and more preferably still between 300 and 550° C.; it is, for example, between 300 and 500° C., in particular between 350 and 500° C.

Said calcined hydrotalcite is advantageously decarbonated. In fact, the decarbonation is generally obtained by the calcination treatment itself.

The calcined hydrotalcite used generally exhibits a carbonate anion/trivalent cation molar ratio of less than 0.3 (decarbonated hydrotalcite), preferably of less than 0.25; this ratio can, for example, be at most 0.15.

It should be noted that at least one anionic surfactant can be intercalated in the structure of the calcined hydrotalcite before it is used (intercalated calcined hydrotalcite).

For this to be done, the calcined hydrotalcite can thus be mixed with a solution of at least one anionic surface-active agent, in particular at a temperature of between 50 and 90° C., for, for example, 1 to 4 hours; the suspension obtained can then be centrifuged and the centrifugation cake dried, in particular in an oven, at a temperature which can vary in particular between 40 and 60° C. Advantageously, recourse to rigorous conditions, in particular to flushing with nitrogen, during the intercalation procedure is not necessary.

The calcined hydrotalcite can be stored for a long time in a dry atmosphere without recarbonating, which facilitates the intercalating stage.

Even though this does not constitute a preferred alternative form, a hydrotalcite intercalated by at least one anionic surface-active agent can also be used in the context of the invention.

Such an intercalated hydrotalcite can be obtained in particular by simultaneously adding, to a vessel heel formed of water, a solution comprising acid salts of the two cations (or two solutions each comprising an acid salt of one of the two cations), a solution of anionic surface-active agent and a sodium hydroxide solution (the latter serving in particular to adjust the pH, in particular to a value of between 10 and 12, for example to 11); the duration of the simultaneous addition can vary between 30 and 90 minutes, for example between 45 and 60 minutes; the temperature of the reaction medium can be maintained between 25 and 95° C.; in particular, the temperature during the simultaneous addition can be maintained between 25 and 35° C., for example at 30° C. approximately; on conclusion of this simultaneous addition, the temperature can be brought and maintained between 85 and 95° C., for example at approximately 90° C., in particular for 1 to 3 hours, for example for 2 hours.

The surface-active agent which is used to form an intercalated hydrotalcite or, preferably, which can be introduced between the inorganic sheets of the calcined hydrotalcite (to form an intercalated calcined hydrotalcite) has an anionic polar part (head), generally complexing with respect to the trivalent cation (for example Al) of the hydrotalcite.

The anionic polar part of said surface-active agent is usually an alkali metal or alkaline earth metal phosphate, phosphonate, carboxylate, sulfonate, sulfate or succinate.

This anionic surface-active agent can be chosen, for example, from:

- alkyl ester sulfonates of formula R—CH(SO$_3$M)—COOR', where R represents a $C_8$–$C_{20}$, in particular $C_{10}$–$C_{16}$, alkyl radical, R' a $C_1$–$C_6$, in particular $C_1$–$C_3$, alkyl radical and M an alkali metal cation (in particular sodium, potassium or lithium), a substituted or unsubstituted ammonium (methyl-, dimethyl-, trimethyl- or tetramethylammonium, dimethylpiperidinium, and the like) cation or a cation derived from an alkanolamine (monoethanolamine, diethanolamine, triethanolamine, and the like), said alkyl ester sulfonates preferably being methyl ester sulfonates in which the R radicals are $C_{14}$–$C_{16}$ radicals;
- alkyl sulfates of formula ROSO$_3$M, where R represents a $C_5$–$C_{24}$, in particular $C_{10}$–$C_{18}$, alkyl or hydroxyalkyl radical, M representing a hydrogen atom or a cation as defined above, and their ethoxylenated (EO) and/or propoxylenated (PO) derivatives having on average between 0.5 and 30, in particular between 0.5 and 10, EO and/or PO units;
- sulfated alkylamides of formula RCONHR'OSO$_3$M where R represents a $C_2$–$C_{22}$, in particular $C_6$–$C_{20}$, alkyl radical, R' a $C_2$–$C_3$ alkyl radical and M a hydrogen atom or a cation as defined above, and their ethoxylenated (EO) and/or propoxylenated (PO) derivatives having on average between 0.5 and 60 EO and/or PO units;
- salts of saturated or unsaturated $C_8$–$C_{24}$, in particular $C_{14}$–$C_{20}$, fatty acids, $C_9$–$C_{20}$ alkylbenzenesulfonates, primary or secondary $C_8$–$C_{22}$ alkylsulfonates, alkylglycerol sulfonates, sulfonated polycarboxylic acids, paraffin sulfonates, N-acyl-N-alkyltaurates, alkyl phosphates, isethionates, alkylsuccinamates, alkylsulfosuccinates, the monoesters or diesters of sulfosuccinates, N-acylsarcosinates, alkylglycoside sulfates or polyethoxycarboxylates, the cation being an alkali metal (in particular sodium, potassium or lithium), a substituted or unsubstituted ammonium (methy-, dimethyl-, trimethyl- or tetramethylammonium or dimethylpiperidinium) residue or a residue derived from an alkanolamine (monoethanolamine, diethanolamine, triethanolamine, and the like).

Mention may in particular be made of alkali metal oleates, for example potassium oleate.

The fundamental components of the hydrotalcite employed according to the invention are usually present in the form of platelets, generally substantially hexagonal platelets; their largest dimension can be between 50 and 300 nm, preferably between 100 and 200 nm.

The compositions comprising polymer(s) in which the calcined and/or intercalated hydrotalcite, advantageously the calcined hydrotalcite (a) and, optionally, in addition intercalated (b), is used as filler, in particular as reinforcing filler, and which constitute another subject matter of the invention, are generally based on one or more polymers or copolymers, in particular on one or more elastomers, in particular thermoplastic elastomers, preferably exhibiting at least one glass transition temperature of between –150 and +300° C., for example between –150 and +20° C.

Mention may be made, as possible polymers, of diene polymers, in particular diene elastomers.

For example, mention may be made of natural rubber, polymers or copolymers deriving from aliphatic or aromatic monomers comprising at least one unsaturation (such as, in particular, ethylene, propylene, butadiene, isoprene or styrene), poly(butyl acrylate), or their blends; mention may also be made of silicone elastomers, functionalized elastomers (for example, functionalized by functional groups capable of reacting with the surface of the hydrotalcite) and halogenated polymers. Polyamides may be mentioned.

The polymer (copolymer) can be a bulk polymer (copolymer), a polymer (copolymer) latex or a solution of polymer (copolymer) in water or in any other appropriate liquid dispersant.

Said compositions comprising polymer(s) can be vulcanized with sulfur (vulcanizates are then obtained) or can be crosslinked, in particular with peroxides.

Another compound, such as precipitated silica, in particular a highly dispersible compound, can optionally also be employed as filler; while the amount by weight of precipitated silica employed can then be a minor amount with respect to that of the hydrotalcite, it can also be equal to or predominant with respect to that employed for the hydrotalcite; the hydrotalcite and the silica can then be introduced into the polymer(s) in the form of a mixture or separately. However, the compositions comprising polymer(s) often do not comprise precipitated silica as filler and/or the filler is formed entirely of calcined and/or intercalated hydrotalcite.

Generally, the compositions comprising polymer(s) additionally comprise at least one coupling agent and/or at least one coating agent; they can also comprise, inter alia, an antioxidant.

The invention, in particular in the case of the use of calcined hydrotalcite, can make it possible in particular to reduce the amount of coupling agent to be employed in compositions comprising polymer(s) while not being damaging to their properties in the vulcanized state.

The proportion by weight of hydrotalcite in the composition comprising polymer(s) can vary within a fairly wide range. It usually represents 4 to 80%, in particular 20 to 80%, for example 30 to 70%, of the amount of the polymer (s). It preferably represents 20 to 80%, for example 30 to 70%, of the amount of the polymer(s) when the compositions comprising polymer(s) do not comprise precipitated silica as filler and/or when the filler is formed entirely of calcined and/or intercalated hydrotalcite.

The present invention also relates to finished articles based on the compositions comprising polymer(s) described above (in particular based on the vulcanizates mentioned above).

Mention may thus be made of tire covers, in particular the sidewalls and the tire tread strip. Calcined hydrotalcite can be used in the tire internal rubber: it can in particular improve the impermeability (in particular to air) thereof, which can make it possible to avoid the use of a halobutyl elastomer (chlorobutyl or bromobutyl elastomer, for example) and/or to employ, preferably predominantly, natural rubber instead.

Mention may also be made, as finished articles, of floor coverings, shoe soles, components of vehicle caterpillar tracks, rollers for cableways, seals for domestic electrical appliances, seals for liquid or gas pipes, braking system seals, sheathings, cables, transmission belts, gas barriers or flame-retardant materials.

The following examples illustrate the invention without, however, limiting the scope thereof.

EXAMPLE 1

Two polymer compositions devoid of coupling agent are prepared:

- one comprising high dispersibility precipitated silica Z1165 MP, sold by Rhodia, with BET specific surface of 150 m$^2$/g and with a density of 2.1 g/cm$^3$ (reference composition R1),
- the other comprising calcined hydrotalcite manufactured by Süd Chemie (under the name EXM 701), with a BET specific surface of 160 m$^2$/g and with a density of 2.8 g/cm$^3$ (composition C1).

TABLE 1

(compositions in parts by weight)

|  | Composition R1 | Composition C1 |
|---|---|---|
| SBR[(1)] | 100 | 100 |
| Z1165MP | 40 | 0 |
| Calcined hydrotalcite | 0 | 40 |
| Diphenylguanidine | 1.45 | 1.45 |
| Stearic acid | 1.1 | 1.1 |
| Zinc oxide | 1.82 | 1.82 |
| Antioxidant[(2)] | 1.45 | 1.45 |
| Sulfenamide[(3)] | 1.3 | 1.3 |
| Sulfur | 1.1 | 1.1 |

(1) Styrene-butadiene copolymer synthesized in solution (Buna VSL 5525-1 type), comprising 27.3% of oil
(2) N-(1,3-Dimethylbutyl)-N'-phenyl-p-phenylenediamine
(3) N-Cyclohexyl-2-benzothiazylsulfenamide The compositions are prepared by processing the elastomers thermomechanically in an internal mixer (Brabender type) with a volume equal to 75 cm$^3$, in two stages, with a mean speed of the blades of 60 revolutions/minute, until a temperature of 110° C. is obtained, these stages being followed by an acceleration stage, carried out in an internal mixer (Brabender type), and then by a finishing stage, carried out on an external mixer.

The vulcanization of the compositions is adjusted to the kinetics of vulcanization of the corresponding blends.

The properties of the compositions are set out below, the measurements having been carried out (on the vulcanized compositions) according to the following standards and/or methods:

Vulcanization Properties
Standard NF T 43015

A Monsanto 100 S rheometer is used, in particular for the measurement of the mini. torque (Tmin) and maxi. torque (Tmax).

Ts2 corresponds to the time during which control of the blending is possible; the polymer mixture cures from Ts2 (beginning of vulcanization).

T90 corresponds to the time at the end of which 90% of the vulcanization has been carried out.

Mechanical Properties

Tension (moduli): Standard NF T 46002

The x % moduli correspond to the stress measured at a tensile deformation of x %.

Shore A hardness: Standard ASTM D2240

The value under consideration is determined 15 seconds after the application of the force.

Dynamic Properties

The true (G') and imaginary (G") moduli and the tangent of the loss angle (tan δ), defined as the ratio of G" to G', are measured at different degrees of deformation and at different temperatures on a mechanical spectrometry device (Viscoanalyzer VA2000 from Metravib RDS). Two types of test are carried out: deformation scannings, at a set temperature and a set frequency, to determine the properties of non-linearity of the compositions (Payne effect), and temperature scannings, at a set deformation and set frequency.

The conditions of the test for the deformation scannings are as follows:

The test specimens are parallelepipedal in shape (length 6 mm, width 4 mm, thickness 2.5 mm, approximately). A sinusoidal deformation of increasing amplitude is applied at a constant frequency of 5 Hz. G', G" and tan δ are evaluated at each degree of deformation. Hereinbelow, ΔG' refers to the difference between the moduli G' measured at a deformation under shear conditions of 0.001 and the modulus G' measured at a deformation under shear conditions of 1, and tan δ max corresponds to the maximum of the tangent of the loss angle as a function of the deformation.

The conditions of the test for the temperature scannings are as follows:

The test specimens are parallelepipedal in shape (length 15 mm, width 6 mm, thickness 2.5 mm, approximately). A sinusoidal deformation with a constant amplitude equal to 50 microns is applied under tensile conditions at a constant frequency of 10 Hz, the rate of rise in temperature being 1° C./min. G', G" and tan δ are evaluated at each temperature.

It is found that the composition C1 according to the invention exhibits an advantageous compromise in properties in comparison with that of the reference composition R1.

With comparable kinetics of vulcanization to those of the reference composition R1, the composition C1 results in a more marked strengthening in terms of moduli.

Furthermore, this strengthening effect is perceptible for very low deformations. Deformations of at least 600% have to be achieved for the reference composition R1 to offer the same behavior in terms of strengthening as the composition C1.

In the case of the composition C1, the slightly higher amplitude of the fall in the modulus (Payne effect) is accompanied by a fall in the maximum of tan δ as a function of the deformation. This composition is therefore a lesser source of dissipation of mechanical energy. This advantage can be used in applications requiring a low dissipation.

The composition C1 exhibits a higher glassy true modulus (G') than that obtained for the reference composition R1, while having a similar or a slightly lower dissipation. These characteristics can be used in applications requiring stiffness in the glassy state or stiffness in the rubbery state and low dissipation of energy, while retaining the dissipation properties at approximately 0° C.

TABLE 2

|  | Composition R1 | Composition C1 |
|---|---|---|
| Vulcanization |  |  |
| Tmin (In. lb) | 12.4 | 14.3 |
| Ts2 (min) | 7.3 | 4.5 |

TABLE 2-continued

|  | Composition R1 | Composition C1 |
| --- | --- | --- |
| T90 (min) | 43.1 | 38.2 |
| Tmax (In. lb) | 48.6 | 60.3 |
| Mechanical |  |  |
| 100% Modulus (MPa) | 1.2 | 1.3 |
| 300% Modulus (MPa) | 2.4 | 3.2 |
| Shore A hardness | 50 | 50 |
| Dynamic (Payne effect) |  |  |
| ΔG' (MPa) | 3.5 | 4 |
| tan δ max | 0.34 | 0.30 |
| Dynamic (temperature) |  |  |
| $G'_{T=-50°\,C.}$ (GPa) | 2.8 | 3.8 |
| $G''_{T=-50°\,C.}$ (MPa) | 25.3 | 41.6 |
| tan $δ_{T=-50°\,C.}$ | 0.009 | 0.01 |
| $G'_{T=0°\,C.}$ (MPa) | 57.1 | 71.9 |
| $G''_{T=0°\,C.}$ (MPa) | 50.8 | 58.8 |
| tan $δ_{T=0°\,C.}$ | 0.89 | 0.83 |
| $G'_{T=60°\,C.}$ (MPa) | 5.8 | 13.4 |
| $G''_{T=60°\,C.}$ (MPa) | 0.45 | 0.75 |
| tan $δ_{T=60°\,C.}$ | 0.084 | 0.055 |

EXAMPLE 2

Three polymer compositions are prepared:
one comprising precipitated silica identical to that used in example 1 and a coupling agent (reference composition R2), the other two each comprising calcined hydrotalcite identical to that used in example 1 and a coupling agent (compositions C2 and C3).

TABLE 3

(compositions in parts by weight)

|  | Composition R2 | Composition C2 | Composition C3 |
| --- | --- | --- | --- |
| SBR[1] | 100 | 100 | 100 |
| Z1165MP | 40 | 0 | 0 |
| Calcined hydrotalcite | 0 | 60 | 60 |
| Silane Si69[2] | 3.2 | 3.2 | 4.8 |
| Diphenyl-guanidine | 1.45 | 1.45 | 1.45 |
| Stearic acid | 1.1 | 1.1 | 1.1 |
| Zinc oxide | 1.82 | 1.82 | 1.82 |
| Anti-oxidant[3] | 1.45 | 1.45 | 1.45 |
| Sulfen-amide[4] | 1.3 | 1.3 | 1.3 |
| Sulfur | 1.1 | 1.1 | 1.1 |

[1]Styrene-butadiene copolymer synthesized in solution (Buna VSL 5525-1 type), comprising 27.3% of oil
[2]Filler/polymer coupling agent (sold by Degussa)
[3]N-(1,3-Dimethylbutyl)-N'-phenyl-p-phenylenediamine
[4]N-Cyclohexyl-2-benzothiazylsulfenamide The composition C3 comprises approximately the same level by volume of filler as the reference composition R2 and as the composition C2; however, its level of coupling agent is adjusted to the weight and to the specific surface of the calcined hydrotalcite so that the same theoretical level of coating of the filler is obtained as with the precipitated silica mentioned.

The compositions are prepared by processing the elastomers thermomechanically in an internal mixer (Brabender type) with a volume equal to 350 cm³, in two stages, with a mean speed of the blades of 60 revolutions/minute, until a temperature of 140° C. is obtained, these stages being followed by an acceleration stage, carried out in an internal mixer (Brabender type), and then by a finishing stage, carried out on an external mixer.

The vulcanization of the compositions is adjusted to the kinetics of vulcanization of the corresponding blends.

The properties of the compositions are set out below, the measurements having been carried out (on the vulcanized compositions) according to the standards and/or methods indicated in example 1, for the mechanical properties, and as follows, for the rheological properties:

Rheological Properties

Mooney consistency: Standard NF T 43005 (measurement of Mooney broad (1+4) at 100° C. using a Mooney viscometer).

TABLE 4

|  | Composition R2 | Composition C2 | Composition C3 |
| --- | --- | --- | --- |
| Mooney consistency | 50 | 69 | 66 |
| Mechanical |  |  |  |
| 100% modulus (MPa) | 1.8 | 2.6 | 2.9 |
| 300% modulus (MPa) | 8.9 | 8.6 | 10.3 |
| Shore A hardness | 55 | 57 | 55 |

It is found that the compositions C2 and C3 according to the invention exhibit an advantageous compromise in properties in comparison with that of the reference composition R2.

EXAMPLE 3

Two polymer compositions are prepared:
one comprising precipitated silica identical to that used in example 1 and a coupling agent (reference composition R3),
the other comprising calcined hydrotalcite identical to that used in example 1 and a coupling agent (composition C4).

TABLE 5

(compositions in parts by weight)

|  | Composition R3 | Composition C4 |
| --- | --- | --- |
| SBR[1] | 100 | 100 |
| Z1165MP | 50 | 0 |
| Calcined hydrotalcite | 0 | 50 |
| Silane Si69[2] | 4 | 4 |
| Diphenylguanidine | 1.45 | 1.45 |
| Stearic acid | 1.1 | 1.1 |
| Zinc oxide | 1.82 | 1.82 |
| Antioxidant[3] | 1.45 | 1.45 |
| Sulfenamide[4] | 1.3 | 1.3 |
| Sulfur | 1.1 | 1.1 |

[1]Styrene-butadiene copolymer synthesized in solution (Buna VSL 5525-1 type), comprising 27.3% of oil
[2]Filler/polymer coupling agent (sold by Degussa)
[3]N-(1,3-Dimethylbutyl)-N'-phenyl-p-phenylenediamine
[4]N-Cyclohexyl-2-benzothiazylsulfenamide The compositions are prepared by processing the elastomers thermomechanically in an internal mixer (Brabender type) with a volume equal to 75 cm³, in one stage, with a mean speed of the blades of 52 revolutions/minute, until a temperature of 110° C. is obtained, this stage being followed by an acceleration stage, carried out in an internal mixer (Brabender type), and then by a finishing stage, carried out on an external mixer.

The vulcanization of the compositions is adjusted to the kinetics of vulcanization of the corresponding blends.

The properties of the compositions are set out below, the measurements having been carried out (on the vulcanized compositions) according to the standards and/or methods indicated in example 1 (the deformation and the tensile strength being measured according to Standard NF T 46002):

TABLE 6

|  | Composition R3 | Composition C4 |
| --- | --- | --- |
| Vulcanization |  |  |
| Tmin (In. lb) | 13.1 | 12.5 |
| Ts2 (min) | 7.3 | 2.4 |
| T90 (min) | 42.3 | 42.1 |
| Cmax (In. lb) | 74.5 | 60.0 |
| Mechanical |  |  |
| 100% Modulus (MPa) | 2.9 | 2.9 |
| 300% Modulus (MPa) | 12.1 | 12.3 |
| Deformation at break (%) | 400 | 445 |
| Tensile strength (MPa) | 18.6 | 19.6 |
| Dynamic (Payne effect) |  |  |
| ΔG' (MPa) | 8.2 | 4 |
| tan δ max | 0.47 | 0.30 |

It is found that the composition C4 according to the invention exhibits a compromise in properties which is on the whole superior to that of the reference composition R3.

While exhibiting comparable, indeed even better, kinetics of vulcanization and strengthening properties (100% and 300% moduli), the composition C4 has improved ultimate properties (tensile strength and deformation at break).

Furthermore, the composition C4 has much more advantageous dynamic properties than those of the composition R3, in this instance a lower amplitude of the fall in the modulus and a substantial fall in the maximum of tangent δ as a function of the deformation (very low dissipation of mechanical energy).

EXAMPLE 4

A polymer composition comprising calcined hydrotalcite identical to that used in example 1 and exhibiting a content by weight of coupling agent of 4.4% with respect to the weight of hydrotalcite is prepared (composition C5).

Its properties are compared with those of the reference composition R3 prepared in example 3, which comprises precipitated silica identical to that used in example 1 and which exhibits a content of coupling agent of 8% with respect to the weight of silica.

TABLE 7

(compositions in parts by weight)

|  | Composition R3 | Composition C5 |
| --- | --- | --- |
| SBR[1] | 100 | 100 |
| Z1165MP | 50 | 0 |
| Calcined hydrotalcite | 0 | 68 |
| Silane Si69[2] | 4 | 3 |
| Diphenylguanidine | 1.45 | 1.45 |
| Stearic acid | 1.1 | 1.1 |
| Zinc oxide | 1.82 | 1.82 |
| Antioxidant[3] | 1.45 | 1.45 |

TABLE 7-continued (compositions in parts by weight)

|  | Composition R3 | Composition C5 |
| --- | --- | --- |
| Sulfenamide[4] | 1.3 | 1.3 |
| Sulfur | 1.1 | 1.1 |

[1]Styrene-butadiene copolymer synthesized in solution (Buna VSL 5525-1 type), comprising 27.3% of oil
[2]Filler/polymer coupling agent (sold by Degussa)
[3]N-(1,3-Dimethylbutyl)-N'-phenyl-p-phenylenediamine
[4]N-Cyclohexyl-2-benzothiazylsulfenamide The composition C5 is prepared as in example 3.

The properties of the compositions are set out below, the measurements having been carried out (on the vulcanized compositions) according to the standards and/or methods indicated in examples 1 and 3:

TABLE 8

|  | Composition R3 | Composition C5 |
| --- | --- | --- |
| Vulcanization |  |  |
| Tmin (In. lb) | 13.1 | 11.7 |
| Ts2 (min) | 7.3 | 2.2 |
| T90 (min) | 42.3 | 42.0 |
| Cmax (In. lb) | 74.5 | 58.5 |
| Mechanical |  |  |
| 100% Modulus (MPa) | 2.9 | 3.1 |
| 300% Modulus (MPa) | 12.1 | 13.5 |
| Deformation at break (%) | 400 | 430 |
| Tensile strength (MPa) | 18.6 | 19.3 |
| Dynamic (Payne effect) |  |  |
| ΔG' (MPa) | 8.2 | 3.1 |
| tan δ max | 0.47 | 0.31 |

It is found that the composition C5 according to the invention, despite a reduced amount of coupling agent with respect to that in the reference composition R3, results in a particularly advantageous compromise in properties.

EXAMPLE 5

Two polymer compositions are prepared:
- one comprising precipitated silica identical to that used in example 1 and calcined hydrotalcite identical to that used in example 1, these being in a ratio by mass of 90/10, and a coupling agent (composition C6),
- the other comprising precipitated silica identical to that used in example 1 and calcined hydrotalcite identical to that used in example 1, these being in a ratio by mass of 50/50, and a coupling agent (composition C7).

Their properties are compared with those of the reference composition R3 prepared in example 3, which comprises precipitated silica identical to that used in example 1 and a coupling agent.

TABLE 9

(compositions in parts by weight)

|  | Composition R3 | Composition C6 | Composition C7 |
| --- | --- | --- | --- |
| SBR[1] | 100 | 100 | 100 |
| Z1165MP | 50 | — | — |
| Z1165MP (90) + | — | 51.5 | — |

TABLE 9-continued (compositions in parts by weight)

|  | Composition R3 | Composition C6 | Composition C7 |
|---|---|---|---|
| calcined hydrotalcite (10) mixture |  |  |  |
| Z1165MP (50) + calcined hydrotalcite (50) mixture | — | — | 57.5 |
| Silane Si69[2] | 4 | 4 | 4 |
| Diphenyl-guanidine | 1.45 | 1.45 | 1.45 |
| Stearic acid | 1.1 | 1.1 | 1.1 |
| Zinc oxide | 1.82 | 1.82 | 1.82 |
| Antioxidant[3] | 1.45 | 1.45 | 1.45 |
| Sulfenamide[4] | 1.3 | 1.3 | 1.3 |
| Sulfur | 1.1 | 1.1 | 1.1 |

[1]Styrene-butadiene copolymer synthesized in solution (Buna VSL 5525-1 type), comprising 27.3% of oil
[2]Filler/polymer coupling agent (sold by Degussa)
[3]N-(1,3-Dimethylbutyl)-N'-phenyl-p-phenylenediamine
[4]N-Cyclohexyl-2-benzothiazylsulfenamide The compositions R3, C6 and C7 comprise substantially the same level by volume of filler.

The compositions C6 and C7 are prepared as in example 3.

The properties of the compositions are set out below, the measurements having been carried out (on the vulcanized compositions) according to the standards and/or methods indicated in examples 1 and 3:

TABLE 10

|  | Composition R3 | Composition C6 | Composition C7 |
|---|---|---|---|
| Vulcanization |  |  |  |
| Tmin (In. lb) | 13.1 | 13.7 | 13.0 |
| Ts2 (min) | 7.3 | 3.1 | 5.2 |
| T90 (min) | 42.3 | 40.0 | 39.0 |
| Cmax (In. lb) | 74.5 | 78.9 | 79.5 |
| Mechanical |  |  |  |
| 100% Modulus (MPa) | 2.9 | 3.1 | 3.5 |
| 300% Modulus (MPa) | 12.1 | 13.1 | 14.0 |
| Deformation at break (%) | 400 | 430 | 450 |
| Tensile strength (MPa) | 18.6 | 22.2 | 22.8 |
| Dynamic (Payne effect) |  |  |  |
| ΔG' (MPa) | 8.2 | 5.2 | 5.0 |
| tan δ max | 0.47 | 0.36 | 0.35 |

It is found that the compositions C6 and C7 according to the invention exhibit a compromise in properties on the whole superior to that of the reference composition R3.

While exhibiting comparable, indeed even better, kinetics of vulcanization and strengthening properties, the compositions C6 and C7 have improved ultimate properties (tensile strength and deformation at break).

Furthermore, the compositions C6 and C7 have much more advantageous dynamic properties than those of the composition R3, in this instance a lower amplitude of the fall in the modulus and a substantial fall in the maximum of tangent δ as a function of the deformation (very low dissipation of mechanical energy), this being the case even when calcined hydrotalcite is present in a minor proportion with respect to the precipitated silica (composition C6).

What is claimed is:

1. A composition comprising polymer(s), and at least one calcined hydrotalcite intercalated with at least one anionic surface-active agent, as filler, wherein the hydrotalcite is calcined before being intercalated.

2. The composition as claimed in claim 1, wherein said calcined hydrotalcite is decarbonated.

3. The composition as claimed in claim 1, wherein the hydrotalcite exhibits a carbonate anion/trivalent cation molar ratio of less than 0.3.

4. The composition as claimed in claim 1, wherein the hydrotalcite presents a divalent cation/trivalent cation molar ratio between 1 and 8.

5. The composition as claimed in claim 4, wherein the divalent cation is Mg, Ni, Zn or Co.

6. The composition as claimed in claim 4, wherein the trivalent cation is Al, Ga, Fe or Cr.

7. The composition as claimed in claim 4, wherein the divalent cation is Mg and the trivalent cation is Al.

8. The composition as claimed in claim 7, wherein the Mg/Al molar ratio is between 1.5 and 5.

9. The composition as claimed in claim 1, wherein said hydrotalcite comprises at least one monovalent cation and at least one trivalent cation.

10. The composition as claim as in claim 1, wherein said polymer exhibits a glass transition temperature of between −150 and +300° C.

11. The composition as claimed in claim 1, wherein said polymer is a thermoplastic elastomer.

12. The composition as claimed in claim 1, further comprising at least one coupling agent or at least one coating agent.

13. A finished article based on at least one composition as defined in claim 1.

14. The finished article as claimed in claim 13, being a tire cover.

15. A process for reinforcing polymer(s), comprising the steps of adding to said polymer(s) a reinforcing filler amount of at least one calcined hydrotalcite as filler wherein the hydrotalcite is further intercalated with at least one anionic surface-active agent.

16. The process according to claim 15, wherein the hydrotalcite presents a divalent cation/trivalent cation molar ratio between 1 and 8.

17. The process according to claim 16, wherein the divalent cation is Mg, Ni, Zn or Co.

18. The process according to claim 16, wherein the trivalent cation is Al, Ga, Fe or Cr.

19. The process according to claim 16, wherein the divalent cation is Mg and the trivalent cation is Al.

20. The process according to claim 19, wherein the Mg/Al molar ratio is between 1.5 and 5.

21. The process according to claim 15, wherein said polymer exhibits a glass transition temperature of between −150 and +300° C.

22. The process according to claim 15, wherein said polymer is a thermoplastic elastomer.

* * * * *